United States Patent
Krook et al.

(10) Patent No.: US 12,522,245 B2
(45) Date of Patent: Jan. 13, 2026

(54) COMPUTER-IMPLEMENTED METHOD FOR MANAGING AN OPERATIONAL DESIGN DOMAIN'S EXPANSION FOR AN AUTOMATED DRIVING SYSTEM

(71) Applicant: ZENSEACT AB, Gothenburg (SE)

(72) Inventors: Jonas Krook, Gothenburg (SE); Zhennan Fei, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 205 days.

(21) Appl. No.: 18/394,306

(22) Filed: Dec. 22, 2023

(65) Prior Publication Data
US 2024/0208541 A1 Jun. 27, 2024

(30) Foreign Application Priority Data
Dec. 22, 2022 (EP) ..................................... 22215738

(51) Int. Cl.
| | |
|---|---|
| *B60W 60/00* | (2020.01) |
| *B60W 50/00* | (2006.01) |
| *B60W 50/08* | (2020.01) |

(52) U.S. Cl.
CPC ...... *B60W 60/0018* (2020.02); *B60W 50/085* (2013.01); *B60W 60/0053* (2020.02); *B60W 2050/0075* (2013.01)

(58) Field of Classification Search
CPC .......... B60W 60/0018; B60W 50/085; B60W 60/0053; B60W 2050/0075; B60W 50/14;
(Continued)

(56) References Cited

U.S. PATENT DOCUMENTS

2021/0107499 A1 4/2021 Brannstrom et al.
2021/0387647 A1 12/2021 Koopman, Jr.
(Continued)

FOREIGN PATENT DOCUMENTS

CN 109606385 B 4/2021

OTHER PUBLICATIONS

Wood, Matthew et al.; "Safety First for Automated Driving"; Jul. 13, 2019; XP055844243, Retrieved from the Internet: URL:https://www.connectedautomateddriving.eu/wp-content/uploads/2019/09/Safety_First_for_Automated_Driving.pdf; 157 pages.
(Continued)

*Primary Examiner* — Brian P Sweeney
*Assistant Examiner* — Alexander George Matta
(74) *Attorney, Agent, or Firm* — Sage Patent Group

(57) ABSTRACT

A method for managing an Operational Design Domain (ODD) expansion for an Automated Driving System (ADS) of a vehicle is disclosed. The method includes: obtaining a plurality of scenario parameters defining the environment of the vehicle, wherein each scenario parameter corresponds to a respective condition of the ODD; in response to the plurality of scenario parameters fulfilling the plurality of ODD conditions: allowing the ADS to be activated or to remain active; if not: querying a logic formula based on the obtained plurality of scenario parameters, such that if at least one soft constraint of the logical formula is satisfied without violating any hard constraints of the logical formula, and allowing the ADS to be activated in a degraded mode by limiting one or more variable state parameters of the ADS to conform to the determined set of values of the one or more variable state parameters.

15 Claims, 3 Drawing Sheets

(58) Field of Classification Search
CPC ......... B60W 2552/00; B60W 2554/00; B60W 2555/20; B60W 60/0015; B60W 60/005; H04W 4/44; G06F 30/15
See application file for complete search history.

(56) References Cited

U.S. PATENT DOCUMENTS

| | | | |
|---|---|---|---|
| 2022/0126864 A1* | 4/2022 | Moustafa | B60W 40/09 |
| 2023/0140569 A1* | 5/2023 | Foster | B60W 30/146 |
| | | | 701/400 |
| 2023/0174115 A1* | 6/2023 | Fei | B60W 60/0057 |

OTHER PUBLICATIONS

Fu, Yuting et al.; "A Formally Verified Highly Resilient Safety Concept with Degraded Modes for Automated Driving"; arxiv.org, Cornell University Library, Ithaca, NY; Nov. 2, 2020; XP081805453; 11 pages.
Extended European Search Report mailed May 22, 2023 for European Application No. 22215738.0, 5 pages.

* cited by examiner

COMPUTER-IMPLEMENTED METHOD FOR MANAGING AN OPERATIONAL DESIGN DOMAIN'S EXPANSION FOR AN AUTOMATED DRIVING SYSTEM

CROSS-REFERENCE TO RELATED APPLICATIONS

The present application for patent claims priority to European Patent Office Application Ser. No. 22215738.0, entitled "A COMPUTER-IMPLEMENTED METHOD FOR MANAGING AN OPERATIONAL DESIGN DOMAIN'S EXPANSION FOR AN AUTOMATED DRIVING SYSTEM" filed on Dec. 22, 2022, assigned to the assignee hereof, and expressly incorporated herein by reference.

TECHNICAL FIELD

The present inventive concept relates to the field of autonomous vehicles. In particular, it is related to methods and apparatuses for managing Operational Design Domains for Automated Driving Systems.

BACKGROUND

During the last few years, the research and development activities related to autonomous vehicles have exploded in number and many different approaches are being explored. An increasing portion of modern vehicles has advanced driver-assistance systems (ADAS) to increase vehicle safety and more generally road safety. ADAS—which for instance may be represented by adaptive cruise control (ACC), collision avoidance systems, forward collision warning, lane support systems, etc.—are electronic systems that may aid a vehicle driver while driving. Today, there is ongoing research and development within a number of technical areas associated to both the ADAS and the Autonomous Driving (AD) field. ADAS and AD may also be referred to under the common term Automated Driving System (ADS), which for the purpose of the present disclosure, is considered to correspond to all of the different levels of automation as for example defined by the SAE J3016 levels 1-5 of driving automation.

In a not too distant future, ADS solutions are expected to have found their way into a majority of the new cars being put on the market. An ADS may be construed as a complex combination of various components that can be defined as systems where perception, decision-making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

ADS features (e.g. ACC, Lane Change Assist, Traffic Jam Pilots, Highway Pilots, etc.) as described above are, however, bound to be required to function with a high integrity to provide sufficiently low risk for the vehicle occupant(s) as well as their surrounding environments. One way of ensuring that the risk is sufficiently low it to limit the ADS to only operate under certain conditions. So called Operational Design Domains (ODDs) are commonly used to define those conditions sufficient for approving or rejecting ADS features. If the vehicle is within the ODD, the ADS may be activated. However, if the vehicle is outside the ODD, the ADS may be deactivated. In response to the ADS being deactivated, different actions can be performed depending on what level the ADS feature has. An action may for instance be to simply turn of the feature, perform a handover request or bringing the vehicle to a stop.

Achieving an ADS with a high level of automation, while still fulfilling the safety requirements is not a trivial task. Firstly, it is difficult to define a complete set of possible scenarios that the vehicle can be exposed to. Secondly, even if that would be possible, it is not an easy task to develop an ADS which is able to handle all those scenarios. There is therefore a need for new and improved solutions relating to Automated Driving Systems.

SUMMARY

The herein disclosed technology seeks to mitigate, alleviate or eliminate one or more of the above-identified deficiencies and disadvantages in the prior art to address various problems relating to an Operational Design Domain, ODD, of Automated Driving Systems, ADSs.

Generally, the ODDs of autonomous vehicles specify certain conditions in which the ADS is allowed to operate. As an example, a certain feature of the ADS may only be allowed to run on roads separated from oncoming traffic and pedestrians, in dry weather, and at daytime. Anything that does not fulfil these conditions can cause the ego-vehicle to leave the ODD. If the vehicle leaves the ODD, a handover request of the driver is typically prompted. If the driver does not take control, a Minimal Risk Maneuver (MRM) can be triggered to bring the vehicle to a stop.

Even minor violations, such as light rain, may be enough for requiring the ADS to be deactivated. These types of situations are often left out of the ODD conditions since it can be difficult to define a complete set of requirements of an ODD in which the ADS can operate safely. Since many ODD violations that are minor can still be tolerable from a safety perspective, a more capable ADS can be achieved by a new and improved way of automatically and dynamically evaluating the scenarios falling outside of the ODD. This may effectively lead to an extended ODD, and therefore to a vehicle which can operate autonomously to a greater extent. Put differently, the herein disclosed technology may lead to an increased uptime of the ADS.

Various aspects and embodiments of the disclosed inventive concept are defined below and in the accompanying independent and dependent claims.

According to a first aspect of the disclosed technology, there is provided a computer-implemented method for managing an Operational Design Domain, ODD, expansion for an Automated Driving System, ADS, of a vehicle. The ODD comprises a plurality of ODD conditions that are to be fulfilled by an environment of the vehicle in order to ensure a fulfilment of a plurality of predefined safety requirements. The method comprises: obtaining a plurality of scenario parameters defining the environment of the vehicle, wherein each scenario parameter corresponds to a respective ODD condition; in response to the plurality of scenario parameters fulfilling the plurality of ODD conditions: allowing (S104) the ADS to be activated or to remain active; in response to one or more scenario parameters not fulfilling one or more ODD conditions: querying a logic formula based on the obtained plurality of scenario parameters, wherein the logic formula comprises a conjunction of a set of hard constraints and a set of soft constraints for a plurality of component capabilities of the ADS, such that if at least one soft constraint is satisfied without violating any hard constraints of the set of hard constraints, the ADS fulfils the plurality of predefined safety requirements; wherein each hard constraint of the set of hard constraints defines one or more of: dependencies between one or more component capabilities of the plurality of component capabilities of the ADS and one or more scenario parameters of the plurality of scenario parameters, dependencies between one or more component capabilities of the plurality of component capabilities of the ADS and one or more other component capabilities of the plurality of component capabilities of the ADS; or dependencies between one or more component capabilities of the plurality of component capabilities of the ADS and one or more variable state parameters of the ADS, wherein each soft constraint of the set of soft constraints defines a limit of one or more variable state parameters of the ADS; determining, based on the logic formula and the obtained plurality of scenario parameters, a set of values of the one or more variable state parameters which satisfies at least one soft constraint of the set of soft constraints without violating any hard constraint of the set of hard constraints; and allowing the ADS to be activated in a degraded mode or to switch to a degraded mode by limiting one or more variable state parameters of the ADS to conform to the determined set of values of the one or more variable state parameters.

In addition to the above, a possible associated advantage of the disclosed technology may be that an ADS which can operate in a wider spectrum of scenarios can be achieved in an efficient way. In general, defining an ODD is a complex problem, since, in reality, the full set of ODD conditions is a high dimensional problem with possibly conflicting conditions. For instance, in free-flowing highway traffic there may be lower bounds on the safe speed, whereas in rainy condition there might be upper bounds on the speed. The dependencies between ODD conditions and capabilities of components of the ADS are also non-trivial. Rain can e.g. affect anything from sensor range, to traffic flow, or friction. Further, there is a non-linear relation between speed, braking distance, acceleration and cornering capabilities. This becomes a large combinatorial problem, which is infeasible to solve manually. The proposed method provides for a way of modelling or formalizing component capabilities and ODD conditions in a way that is suitable for automatic reasoning. The presently disclosed technology can be used to dynamically find safe subsets outside the ODD, i.e. degraded modes, where the ADS can continue to operate, but with limited functionality in some way. In particular, the logic formula facilitates formalization of any safety requirements, conditions and scenarios that may relate to the vehicle in order to identify these degraded modes in an efficient way.

Further, the disclosed technology allows for the ADS to continue to operate under a degraded mode, instead of having to deactivate the ADS. This may be advantageous since deactivating the ADS may be less suitable in some situations.

The disclosed technology may be used in providing a dynamic extension of an existing ODD. Put differently, the disclosed technology can provide for an ODD having dynamic boundaries. The disclosed technology may also be used in determining a new and larger ODD from an existing ODD. Additionally, the disclosed technology may be used in determining an ODD from scratch.

With this first aspect of the disclosed technology, similar advantages and preferred features are present as in the other aspects.

According to a second aspect of the disclosed technology, there is provided a computer program product comprising instructions, which, when the program is executed by a computing device, causes the computer to carry out the method according to the first aspect.

With this second aspect of the disclosed technology, similar advantages and preferred features are present as in the other aspects.

According to a third aspect of the disclosed technology, there is provided an apparatus for managing an Operational Design Domain, ODD, expansion for an Automated Driving System, ADS, of a vehicle. The ODD comprises a plurality of ODD conditions that are to be fulfilled by an environment of the vehicle in order to ensure a fulfilment of a plurality of predefined safety requirements. The apparatus comprises control circuitry configured to: obtain a plurality of scenario parameters defining the environment of the vehicle, wherein each scenario parameter corresponds to a respective ODD condition; in response to the plurality of scenario parameters fulfilling the plurality of ODD conditions: allow the ADS to be activated or to remain active; in response to one or more scenario parameter(s) not fulfilling one or more ODD condition(s): query a logic formula based on the obtained plurality of scenario parameters, wherein the logic formula comprises a conjunction of a set of hard constraints and a set of soft constraints for a plurality of component capabilities of the ADS, such that if at least one soft constraint is satisfied without violating any hard constraints of the set of hard constraints, the ADS fulfils the plurality of predefined safety requirements; wherein each hard constraint of the set of hard constraints defines one or more of: dependencies between one or more component capabilities of the plurality of component capabilities of the ADS and one or more scenario parameters of the plurality of scenario parameters, dependencies between one or more component capabilities of the plurality of component capabilities of the ADS and one or more other component capabilities of the plurality of component capabilities of the ADS; or dependencies between one or more component capabilities of the plurality of component capabilities of the ADS and one or more variable state parameters of the ADS, wherein each soft constraint of the set of soft constraints defines a limit of one or more variable state parameters of the ADS; determine, based on the logic formula and the obtained plurality of scenario parameters, a set of values of the one or more variable state parameters which satisfies at least one soft constraint of the set of soft constraints without violating any hard constraint of the set of hard constraints; and allow the ADS to be activated in a degraded mode or to switch to a degraded mode by limiting one or more variable state parameters of the ADS to conform to the determined set of values of the one or more variable state parameters.

With this third aspect of the disclosed technology, similar advantages and preferred features are present as in the other aspects.

According to a fourth aspect of the disclosed technology, there is provided a vehicle. The vehicle comprises: an automated driving system, ADS, and an apparatus for managing an Operational Design Domain, ODD, expansion for the ADS of the vehicle, according to the third aspect.

With this fourth aspect of the disclosed technology, similar advantages and preferred features are present as in the other aspects.

According to a fifth aspect of the disclosed technology, there is provided a non-transitory computer-readable storage medium. The non-transitory computer-readable storage medium stores one or more programs configured to be executed by one or more processors of a processing system, the one or more programs comprising instructions for performing the method according to the first aspect.

With this fifth aspect of the disclosed technology, similar advantages and preferred features are present as in the other aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

The disclosed aspects and preferred embodiments may be suitably combined with each other in any manner apparent to anyone of ordinary skill in the art, such that one or more features or embodiments disclosed in relation to one aspect may also be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
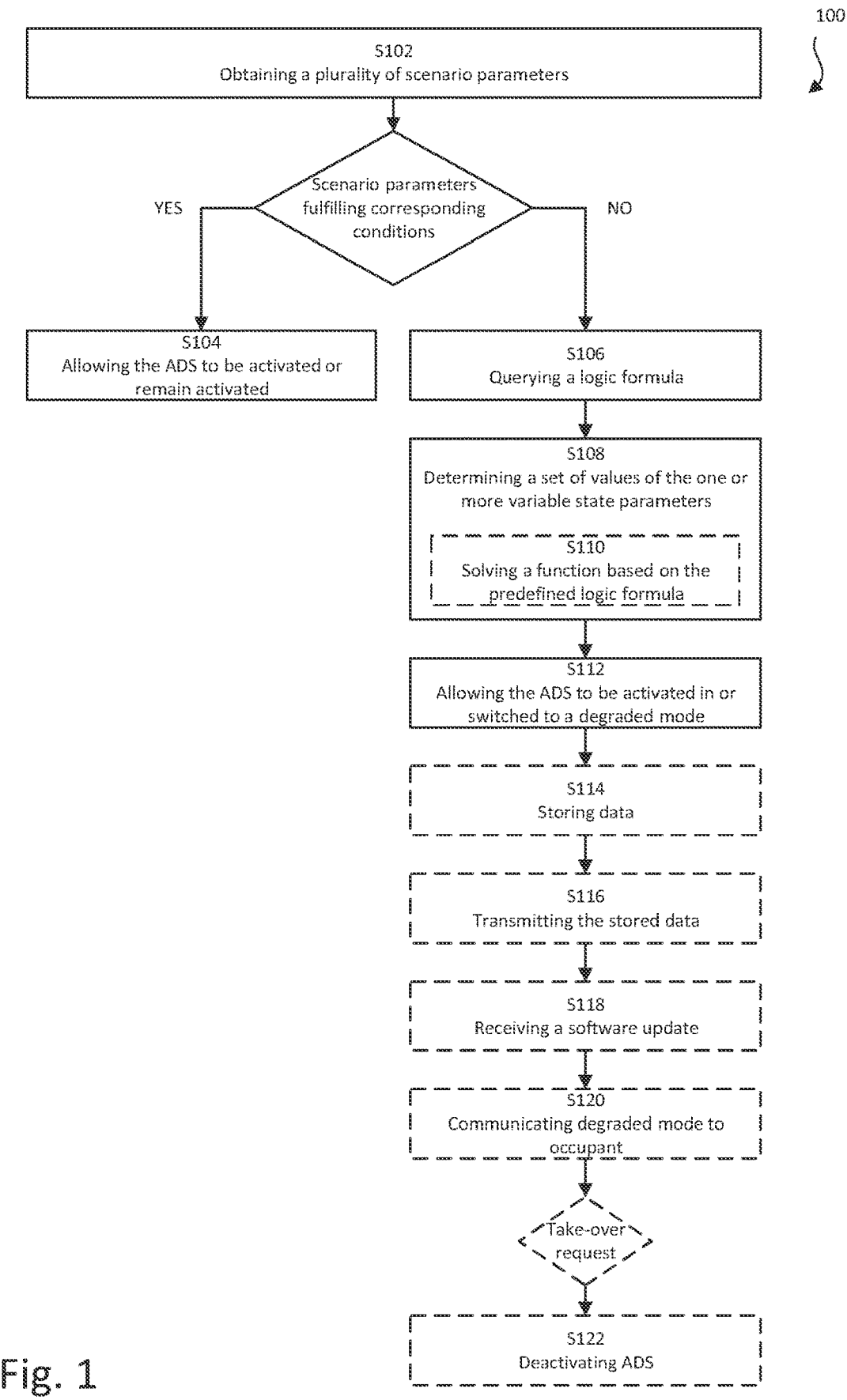
FIG. 1 is a schematic flow chart representation of a computer-implemented method for managing an Operational Design Domain (ODD) expansion for an Automated Driving System (ADS) of a vehicle.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the modules, steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that perform the steps, services and functions disclosed herein when executed by the one or more processors in some embodiments.

It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

Before going into detail of the examples of embodiments of the presently disclosed technology, a number of terms and wordings will now be explained for improved understanding.

The wording "automated driving system" is herein used as a common term for all features related to the control and operation of the autonomous part of an "autonomous" or "semi-autonomous vehicle". The ADS can comprise different ADS features (may also be referred to as ADS functions). The ADS may comprise any advanced driver-assistance systems (ADAS) and/or Autonomous Driving (AD) features. Thus, the ADS feature may correspond to any automation level 1-5 according to SAE J3016 levels of driving automation for on-road vehicles. Preferably, in the context of the presently disclosed technology, the ADS features of the vehicle are level 3 features or higher. The ADS feature may for example be a traffic jam pilot, a highway pilot, or any other SAE J3016 level 3+ ADS feature. However, the principles of the present disclosure may also be applicable to lower level ADS features, such as a lane-change assist feature, lane keeping assist feature (e.g. using map data), or an adaptive cruise control feature.

In order for an automated driving system (ADS) to be allowed to operate, a plurality of predefined "safety requirements" must be fulfilled. The predefined safety requirements being fulfilled may ensure e.g. that a risk of an incident or harm to anyone or to anything is below an acceptable level. For example, a safety requirements may specify that the vehicle should be able to come to a stop within a certain distance depending on a certain speed. As another example, a safety requirement may specify that the vehicle should not collide with a pedestrian at a speed above a threshold, or not at all when travelling at speeds below another threshold. The safety requirements may be formulated as constraints for a plurality of "component capabilities" of the ADS. In other words, capabilities of a plurality of components of the ADS must fulfil certain requirements to ensure that the safety requirements are met.

The wording "component capability" as used herein should be interpreted as a value of the capability of a component of the ADS, or the vehicle as a whole, given certain operating conditions. As an example, a component capability of a sensor may relate to a detection range in different operating conditions. As another example, a component capability of a brake system may relate to a braking distance for different road conditions. The component capability may relate to both external and internal conditions. As an example of external conditions, a sensor range may be limited due to visibility of the surrounding environment, e.g. due to weather conditions. As an example of internal conditions, the sensor range may be limited due to the sensor's hardware or a health status of the sensor. The component capability may further be related to both software and hardware limitations. Software limitations may e.g. be related to connectivity either between components within the vehicle or to external elements. A connectivity between a GPS of the vehicle and a number of satellites could for instance affect a localization algorithm of the ADS. Examples of hardware limitations may for instance be how rain can affect the detection range of a sensor, or an upper limit on a brake capacity of a brake system. By the wording "component", it is herein meant any elements or actuators of the vehicle or ADS such as sensors, brake system, steering system, throttle system, communication systems, etc. and also any other more "high-level" features or functions of the ADS such as e.g. a path planner module, an object detection module, a free-space estimation module, a minimum risk maneuver module, etc. The safety requirements which are to be met may be formulated at a general level, such as the examples given above. Alternatively, the safety requirements may be formulated at a component level such that each component has one or more component requirements. A "module" of the ADS may in the present context be understood as a software and/or hardware component of the ADS configured to cause the ADS to execute a function (e.g. detect objects in an image, generate paths to be executed by the vehicle, generate control signals to one or more actuators of the vehicle, etc.) of the ADS.

The "Operational Design Domain" (ODD) is to be understood as a domain in which an automated driving system (ADS) is allowed to operate. If the vehicle is within the ODD, the ADS is "allowed to operate" in the sense that it fulfils the plurality of safety requirements. In particular, the ODD comprises a plurality of "ODD conditions" that are to be fulfilled by an environment of the vehicle. The ODD conditions may relate to any parameters of the driving environment of the vehicle. For example, the plurality of conditions may comprise at least one of weather conditions, visibility in the surrounding environment, road condition parameters, driving scenario parameters, geographic data parameters, map data parameters, presence of Vulnerable Road Users (VRUs), connectivity parameters, and surrounding object parameters. Fulfilling the plurality of conditions of the ODD may ensure fulfilment of the plurality of safety requirements. Put differently, the ODD may be seen as a transformation of the safety requirements into conditions on the environment of the vehicle in relation to the component capabilities which are to be fulfilled to ensure that the ADS can operate safely. In other words, if the vehicle is outside the ODD, it may no longer be possible to ensure that the safety requirements are fulfilled. In general, the ODD conditions that are to be fulfilled for a specific ADS feature are defined in design-time.

The environment of the vehicle may be defined by a plurality of "scenario parameters". Put differently, the environment of the vehicle may be formulated by the plurality of scenario parameters. Each scenario parameter of the plurality of scenario parameters may correspond to a respective ODD condition. The plurality of scenario parameters may thus comprise at least one of weather conditions, visibility in the surrounding environment, road condition parameters, driving scenario parameters, geographic data parameters, map data parameters, presence of Vulnerable Road Users (VRUs), connectivity parameters, and surrounding object parameters. However, an ODD condition may specify requirements on a combination of several scenario parameters. Thus, the scenario parameters are run-time parameters that the ADS/vehicle is exposed to, while the ODD conditions are design-time parameters onto which one can map the scenario parameters.

The wording "variable state parameters" as used herein, should be interpreted as any adjustable parameter of the ADS or the vehicle. In particular, the variable state parameters should be seen as any parameters relating to the operation of the vehicle, and which could be adjusted in order to find an allowable degraded mode (as is further explained below). The variable state parameters of the ADS may for example comprise at least one of a vehicle speed, automated lane change allowableness, distance to lead vehicle, steering angle, steering angle rate, brake level, acceleration level, acceleration and brake rate, lane choice, allowability of certain turns, overtakes, lateral distance to objects, closeness to lane markers or road edge.

The wording "logic formula", as used throughout the disclosure, should be interpreted as a set of logical expressions. In particular, the logic formula comprises a conjunction of a set of hard constraints and a set of soft constraints. In other words, the logical formula comprises a conjunction of a plurality of logical constraints, where the constraints are either hard or soft constraints. The soft and hard constraints are herein related to the component capabilities. The safety requirements may be encoded into the logic formula (or more specifically into the hard and/or soft constraints) such that if at least one soft constraint is satisfied without violating any hard constraints of the set of hard constraints, the ADS fulfils the plurality of predefined safety requirements.

The "hard constraints" should herein be understood as constraints that must be fulfilled. For example, a detection range of a sensor may have to reach a certain level to fulfil a certain safety requirement. In contrast, the "soft constraints" should herein be understood as constraints that preferably, but not necessarily, are fulfilled. In other words, it is preferred that as many as possible of the soft constraints are satisfied. However, it is sufficient to find at least one soft constraint that is fulfilled without violating any hard constraints in order to find a safe subset outside the ODD. Further, the soft constraints are related to variable state parameters of the vehicle that can be adjusted. The hard and soft constraints are further discussed below in connection with FIG. 1.

FIG. 1 is a flow chart illustrating the steps of a variant of the computer implemented method 200 for managing an Operational Design Domain (ODD) expansion for an Automated Driving System (ADS) of a vehicle. As stated above, the ODD comprises a plurality of ODD conditions that are to be fulfilled by an environment of the vehicle in order to ensure a fulfilment of a plurality of predefined safety requirements. FIG. 1 additionally shows a number of optional steps (indicated by broken lines) of the method 100 forming a number of alternative variants of the method 100.

The wording "expansion", as used herein, should be interpreted broadly and may encompass e.g. dynamically extending the ODD, finding safe subsets outside the ODD, determining a new and extended ODD and/or constructing an entire ODD.

In the following, the different steps are described in more detail with reference to FIG. 1. Even though illustrated in a specific order, the steps of the method 100 may be performed in any suitable order, in parallel, as well as multiple times. For example, steps S114, S116 and S118 may be performed independently from the steps S120 and S122 as further described below.

A plurality of scenario parameters defining the environment of the vehicle are obtained S102. Each scenario parameter corresponds to a respective ODD condition of the plurality of ODD conditions. Thus, the scenario parameters may be compared to a corresponding ODD condition of the plurality of ODD conditions in order to determine whether the environment of the vehicle fulfils the ODD.

The environment (or surrounding environment) of the ego-vehicle can be understood as a general area around the ego-vehicle in which objects (such as other vehicles, landmarks, obstacles, persons etc.) can be detected and identified by vehicle sensors (radar, LIDAR, cameras, etc.), i.e. within a sensor range of the ego-vehicle. The environment may further encompass an area ahead of the vehicle along a planned path of the vehicle.

The term "obtaining", as used throughout the disclosure, is to be interpreted broadly and encompasses receiving, retrieving, collecting, acquiring, and so forth directly and/or indirectly between two entities configured to be in communication with each other or further with other external entities.

One or more scenario parameters of the plurality of scenario parameters may be acquired by sensors of the ego-vehicle or from a memory storage device of the vehicle that stores map data and/or sensor output data. Alternatively, or additionally, the one or more scenario parameters may be received from external sources such as other vehicles or a remote server.

In response to the plurality of scenario parameters fulfilling the plurality of ODD conditions, the ADS is allowed S104 to be activated or to remain active. In other words, in case the scenario parameters fulfil a respective ODD condition, the ADS is activated (if it was deactivated) or continues to operate (if it was already active). It should be noted that depending on the implementation, a mapping between scenario parameters and ODD conditions need not to be one-to-one. For example, two or more scenario parameters may relate to a same ODD condition. Allowing S104 the ADS to be activated may comprise transmitting an activation signal to a control system of the vehicle.

In response to one or more scenario parameter(s) not fulfilling one or more ODD condition(s), a logic formula is queried S106, based on the obtained plurality of scenario parameters. In other words, if at least one scenario parameter does not fulfil a corresponding ODD condition, the logic formula is queried S106. The wording "query" as in "querying the logic formula" may be interpreted as formalizing a current scenario of the vehicle (i.e. as described by the scenario parameters) into a number of logical expressions. The logic formula may be treated as a function of which the scenario parameters may serve as input to the function. Further, the logical function can be solved using automatic reasoning in order to identify an allowable least restraining subset outside the ODD, as will become apparent from the discussion below. Querying S106 the logic formula may be performed online in the vehicle. Alternatively, the logic formula may be at least partly formalized offline in the vehicle or externally to the vehicle. During runtime of the method 100, the step of querying S106 the logic formula may then comprise inputting the scenario parameters into the logic formula.

The logic formula comprises a conjunction of a set of hard constraints and a set of soft constraints for a plurality of component capabilities of the ADS. The conjunction of constraints are formulated such that if at least one soft constraint is satisfied without violating any hard constraints of the set of hard constraints, the ADS fulfils the plurality of predefined safety requirements. Further, the set of hard constraints may comprise any number of hard constraints. Additionally, the set of soft constraints may comprise any number of soft constraints.

Each hard constraint of the set of hard constraints defines one or more of: dependencies between one or more component capabilities of the plurality of component capabilities of the ADS and one or more scenario parameters of the plurality of scenario parameters, dependencies between one or more component capabilities of the plurality of component capabilities of the ADS and one or more other component capabilities of the plurality of component capabilities of the ADS; and/or dependencies between one or more component capabilities of the plurality of component capabilities of the ADS and one or more variable state parameters of the ADS. The dependencies may be formulated as logical expressions. Thus, each hard constraint may comprise a number of logical expressions. It should be noted that a hard constraint may be formed of any number of the dependencies as described above, for any number of components. Further, a hard constraint may comprise a number of sub-requirements, where each sub-requirement comprises a number of logical expressions as described above. The hard constraint may in such case be fulfilled if at least one sub-requirement is fulfilled.

The hard constraints may be defined on a component level. In other words, a component of the ADS may have one or more associated hard constraints. Alternatively, the hard constraints may be defined on an ADS level. In other words, a hard constraint may comprise dependencies associated with one or more components.

A non-limiting example of a dependency between a component capability and a scenario parameter may be a limit of the component capability given a certain value of the scenario parameter. For example, a detection range of a sensor may be limited to a certain value given a certain amount of rain.

A non-limiting example of a dependency between a component capability and another component capability may be a relationship between different components. For example, a brake system may be dependent on a detection range of a sensor.

A non-limiting example of a dependency between a component and a variable state parameter may be a limit of the component capability given a certain value of the variable state parameter. For example, a steering system of the ADS may not be able to perform a certain maneuver given a vehicle speed over a certain level.

It should be noted that the above-described types of dependencies may be combined into forming combined dependencies of the hard constraints. As an example, a hard constraint may comprise several different dependencies.

Each soft constraint defines a limit of one or more variable state parameters of the ADS. Put differently, the soft constraints may define different levels of one or more variable state parameters. As an example, the set of soft constraints may comprise different levels of a vehicle speed, v, e.g. on the form of v=0, v>0, v>2, v>4, v>6, and v>8 units. As described above, the aim may be to satisfy as many soft constraints as possible. In this example, this corresponds to finding the highest possible speed of the vehicle that also satisfy all hard constraints. Assume, for example, that speeds up to 7 units satisfy all hard constraints. Then all of the soft constraints except speed >8 units are fulfilled.

Moving on, a set of values of the one or more variable state parameters which satisfies at least one soft constraint of the set of soft constraints without violating any hard constraint of the set of hard constraints are determined S108, based on the logic formula and the obtained plurality of scenario parameters. The determined set of values of the one or more variable state parameters may be a set of values which satisfies the most soft constraints without violating any hard constraints of the set of hard constraints. In other words, the aim may be to find a degraded mode defined by a set of values of the one or more variable state parameters that fulfils all hard constraints and at least one (but preferably as many as possible) of the soft constraints.

By the wording "degraded mode" is it herein meant an operating mode of the ADS in which it in some way has limited capabilities. The degraded mode may for example be defined by limiting one or more variable state parameters of the ADS, e.g. to the determined set of values of the one or more variable state parameters.

Moving on, the ADS is allowed S112 to be activated in a degraded mode or to switch to a degraded mode by limiting one or more variable state parameters of the ADS to conform to the determined set of values of the one or more variable state parameters. If, for example, it has been determined that vehicle speeds up to 6 units satisfies all hard constraints, then the ADS may limit the speed of the vehicle to 6 units. Allowing the ADS to be activated in or switched to the degraded mode may comprise transmitting an activation signal to a control system of the vehicle or the ADS.

Determining S108 the set of values of the one or more variable state parameters may comprise solving S110 a function based on the logic formula using the obtained plurality of scenario parameters as input and varying the one or more variable state parameters of the ADS in order to obtain an output indicative of the set of values of the one or more variable state parameters which satisfies at least one soft constraint of the set of soft constraints without violating any hard constraints of the set of hard constraints.

The step of querying S106 the logic formula and determining S108 the set of values of the one or more variable state parameters may be performed using automatic reasoning methodology. For example, it may be solved as a maximum satisfiability problem (MaxSAT) or using maximum Satisfiability Modulo Theories (MaxSMT). As is readily understood by the person skilled in the art, other methodologies for automatic reasoning may be used as well.

Data indicative of one or more component capabilities that is affected by the one or more scenario parameters not fulfilling one or more corresponding conditions of the plurality of conditions of the ODD may be stored S114. The data may thus provide information about which components are the cause for failing to meet the ODD conditions. The data may be stored locally on the vehicle.

The stored data may be transmitted S116 to a remote server. The remote server may be implemented as a cloud service. The remote server may be communicatively connected to a plurality of vehicles for monitoring and managing the plurality of vehicles. This may allow the remote server to obtain statistical data of what components most commonly limits the functioning of the ADS. A possible associated advantage is that a vehicle manufacturer or ADS provider can adapt the selection of components of the ADS or the vehicle in order to improve the ADS's capability in future versions. As a non-limiting example, if by use of the stored data, it is found that a certain component, for instance a forward looking proximity sensor, is the limiting component in several cases of high speed driving scenarios, focus can be put towards developing the sensor, the software relating to the sensor, or replacing the sensor with a more capable sensor. Hence, the development process can be made more cost and time efficient, as well as with improved results.

A software update may be received S118 from the remote server, in response to the transmitted stored data. The software update may be determined based on the stored data transmitted to the remote server such that the component capabilities that are affected by the scenario parameters not fulfilling the ODD conditions are improved. The software update may be further based on the statistical data as described above.

The conditions of the ODD and/or scenario parameters defining the environment of the vehicle may comprise at least one of weather conditions, visibility in the surrounding environment, road condition parameters, driving scenario parameters, geographic data parameters, map data parameters, presence of Vulnerable Road Users (VRUs), connectivity parameters, and surrounding object parameters. Weather conditions may e.g. comprise information about a current weather, a weather forecast, an amount of precipitation, etc. Visibility in the surrounding environment may comprise information about a visibility range of any sensors of the vehicle e.g. due to rain, fog, or other weather conditions, time of day, or lighting conditions. Road condition parameters may comprise any information relating to road conditions such as type of road surface (e.g. asphalt, gravel, etc.), quality of road surface (e.g. how even the road is, if there are damages to the road surface, or what condition the lane markers are in (i.e. lane marker quality)), reduced friction (e.g. due to rain, snow, ice etc.). Driving scenario parameters may comprise any information related to the driving scenario, such as a type of driving situation (e.g. highway driving, country road driving, city driving, traffic jam driving, etc.), amount of traffic, travelling speed, road segment (e.g. intersection, exit of highway, undisturbed road segment) etc. Geographic data parameters may comprise any information relating to a geographical position of the vehicle, e.g. determined by a GPS of the vehicle, such as a country, regional area or town of the vehicle, GPS coordinates of the vehicle, etc. The map data parameters may for instance comprise a position of the vehicle on a map, such as a high-definition (HD) map. The map data parameters may further comprise information about a planned route of the vehicle on the map. The presence of VRUs may comprise information about a position and/or movement of e.g. pedestrians or cyclist in a vicinity of the vehicle. The surrounding object parameters may comprise information about any other objects in the vicinity of the vehicle, such as other vehicles, road signs, road constructions, or any other objects, which may be present in or around a path of the vehicle. The connectivity parameters may comprise information about connectivity of or between any elements of the vehicle. Thus, the connectivity parameters may relate both to internal connectivity of the vehicle (such as between a sensor and a control system of the vehicle) or to external connectivity of the vehicle (such as a GPS signal or a wireless connection to a roadside unit).

As stated above, the variable state parameters may be understood as any operational parameters of the vehicle that can be adjusted. The variable state parameters of the ADS may comprise at least one of a vehicle speed, automated lane change allowableness, distance to lead vehicle, steering angle, steering angle rate, brake level, acceleration level, acceleration and brake rate, lane choice, allowability of certain turns, curve speed, overtakes, lateral distance to objects, and/or closeness to lane markers or road edge.

The degraded mode should be interpreted as a mode where the ADS is limited in some way in order to still be operational despite the vehicle being outside the ODD. In other words, if the ADS is active in a degraded mode, the originally intended functionality of the ADS may in some way be restricted (or degraded). The degraded mode may be seen as a subset outside the ODD where any predefined safety requirements of the ADS are still fulfilled. The degraded mode may for example be any one of: limiting a speed of the vehicle, requiring driver-supervision and/or requesting hands-on-wheel.

The degraded mode may be a non-restrictive mode. In the non-restrictive mode, the vehicle is allowed to continue to drive as before under a condition. A driver or passenger of the vehicle may in this case not be aware that the vehicle (or ADS) is operating in the degraded mode. The vehicle may for instance continue to drive with unchanged speed despite leaving the ODD. As an example, assume that the vehicle is in a slow moving traffic jam. In a situation where it starts to rain, the sensors of the vehicle may fail to meet the conditions of the ODD. However, as the speed of the vehicle is low, it may be determined that the ADS may continue to operate in a degraded mode under the condition that the situation does not change (e.g. that the traffic jam is resolved and hence the speed increases). As another example, assume that a quality of lane markers of the road does not fulfill a condition of the ODD for the ADS to be able to handle curvature of the road or changing lanes. In a situation where it is known that the planned route of the vehicle does not currently contain such curvatures or planned lane changes, it may be determined that the ADS may continue to operate in a degraded mode under a condition that the situation does not change.

The degraded mode may be a restrictive mode. In the restrictive mode, the vehicle is allowed to continue to drive with reduced performance. By reduced performance it is herein meant any limitation to the vehicle (or the ADS) in terms of how it functions. The performance may be reduced e.g. by limiting the speed, turning of certain functions (e.g. automatic lane changes, adaptive cruise control, etc.), increasing a distance to a vehicle in front, etc. As an example, assume that the vehicle approaches a road construction work that the steering system cannot handle. Then it may still be possible to pass the road construction work at a lower speed that the steering system can handle. As another example, assume that clearly visible lane markers is required for performing automatic lane changes, but snow on the road prevents this. In such situation, the ADS may still continue to operate, but with the automatic lane change feature disabled. As another example, assume that a certain supply of washer fluid is required for the vehicle to be within the ODD, and if the vehicle does not meet this, a take-over request is prompted. However, it may be determined that the current environment of the vehicle (i.e. as defined by the plurality of scenario parameters) does not require any washer fluid, then the ADS can continue to operate under a degraded mode. As another example, assume that a minimal risk maneuver (MRM) has to be performed. The current scenario parameters may however allow the ADS to operate under limited performance (e.g. limited speed) such that the MRM can be postponed until a safer position to perform the MRM has been reached.

The degraded mode may be communicated S120 to an occupant of the vehicle. In other words, in case the vehicle operates (or intends to operate) in a degraded mode, the occupant of the vehicle may be informed, e.g. visually by means of a user interface of the vehicle, or by sound. The occupant may then decide to take over control of the vehicle. In response to receiving a take-over request from the occupant, the ADS of the vehicle may be deactivated S122.

The one or more scenario parameters not fulfilling the one or more corresponding conditions of the ODD may be temporary changes or relatively static changes of the environment. A temporary change may for example be passing road construction site which the vehicle may pass relatively quickly. A relatively static change of the environment may for example be a light rainfall that does not increase significantly. Dealing with temporary changes, relatively static changes or quasi-static changes may be advantageous in that it may facilitate finding safe subsets outside the ODD.

The ADS may be in the degraded mode as long as the plurality of scenario parameters remains the same. In other words, as long as the situation stays the same, the ADS may continue to operate in the degraded mode. The method 100 may be performed recurrently as the environment of the vehicle develops in order to adapt the ADS based on changes in the environment.

It should be noted that if no set of values of the one or more variable state parameters is found to satisfy all hard constraints and at least one soft constraints, the ADS may be deactivated or prevented from being activated. In case the ADS is deactivated, a hand-over action to the driver or a MRM may be performed.

Executable instructions for performing these functions are, optionally, included in a non-transitory computer-readable storage medium or other computer program product configured for execution by one or more processors.

Figure 2:
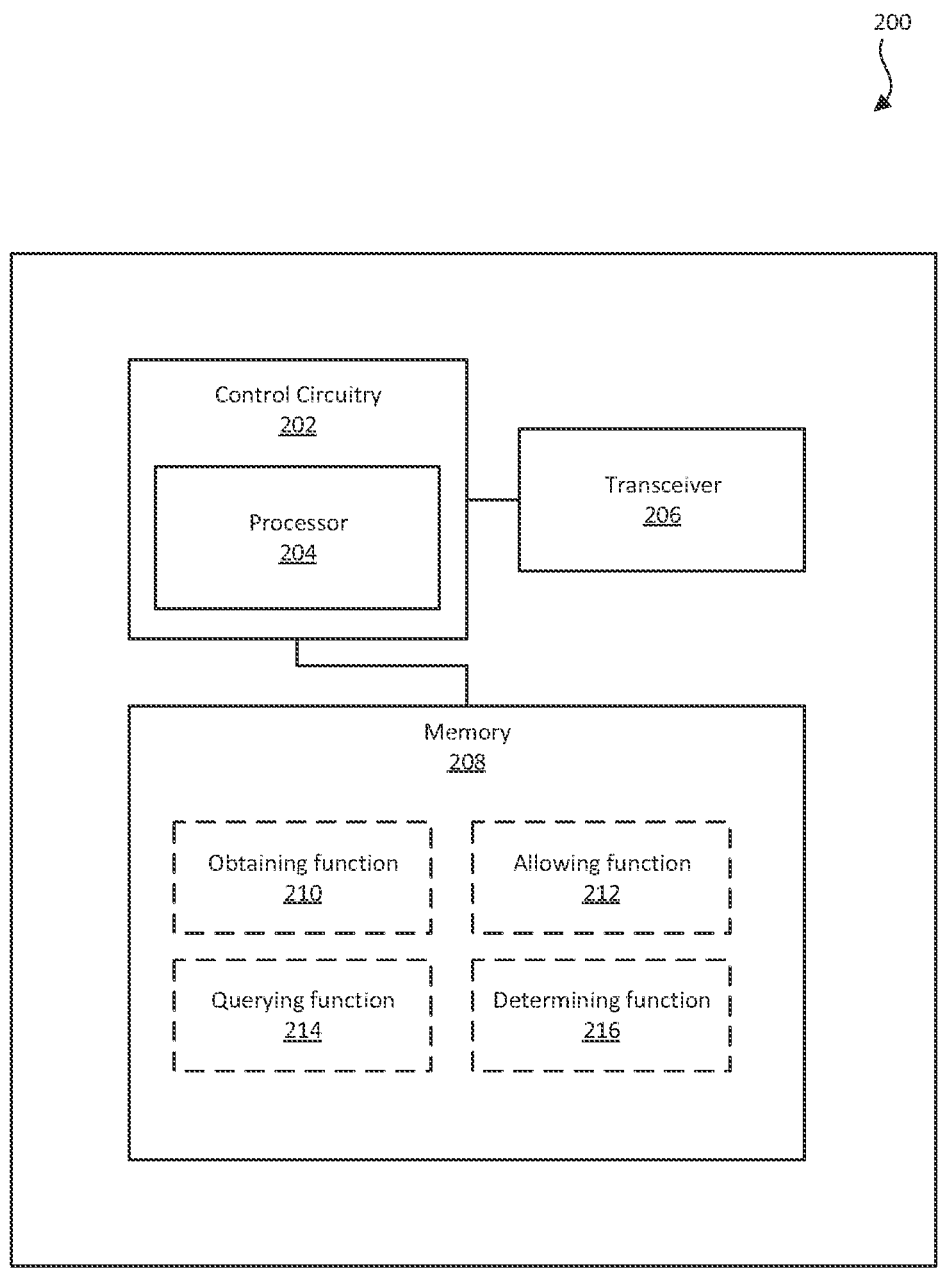
FIG. 2 is a schematic illustration of an apparatus for managing an Operational Design Domain (ODD) expansion for an Automated Driving System (ADS) of a vehicle.

FIG. 2 is a schematic illustration of an apparatus 200 for managing an Operational Design Domain (ODD) expansion for an Automated Driving System (ADS) of a vehicle. The ODD comprises a plurality of ODD conditions that are to be fulfilled by an environment of the vehicle in order to ensure a fulfilment of a plurality of predefined safety requirements.

In particular, the apparatus 200 is configured to perform the techniques described in the foregoing with reference to FIG. 1. The apparatus 200 may be provided locally in the vehicle. However, as can be readily understood, the apparatus 200 may be provided as an external device or unit to the vehicle, such as a remote server or cloud service. In such case, the apparatus 200 may be communicatively connected to the vehicle. A vehicle 300 comprising the apparatus 200 is further described below in connection with FIG. 3.

The apparatus 200 comprises control circuitry 202. The control circuitry 202 may physically comprise one single circuitry device. Alternatively, the control circuitry 202 may be distributed over several circuitry devices. As an example, the apparatus 200 may share its control circuitry 202 with other parts of the electronic device or the vehicle, such as a control system of the vehicle.

As shown in the example of FIG. 2, the apparatus 200 may further comprise a transceiver 206 and a memory 208. The control circuitry 202 being communicatively connected to the transceiver 206 and the memory 208. The control circuitry 202 may comprise a data bus, and the control circuitry 202 may communicate with the transceiver 206 and/or the memory 208 via the data bus.

The control circuitry 202 may be configured to carry out overall control of functions and operations of the apparatus 200. The control circuitry 202 may include a processor 204, such as a central processing unit (CPU), microcontroller, or microprocessor. The processor 204 may be configured to execute program code stored in the memory 208, in order to carry out functions and operations of the apparatus 200. The control circuitry 202 is configured to perform the steps of the method 100 as described above in connection with FIG. 1. The steps may be implemented in one or more functions stored in the memory 208. The control circuitry 202 may be configured to execute an obtaining function 210, an allowing function 212, a querying function 214 and a determining function 216. It should be noted that the various functions and operation of the apparatus 200 may be implemented in additional functions than those described herein. In addition, one or more of the above functions may be implemented together in a common function.

The transceiver 206 may be configured to enable the apparatus 200 to communicate with other devices. The transceiver 206 may both transmit data from and receive data to the apparatus 200. For example, the apparatus 200 may obtain data about the environment (e.g. scenario parameters) of the vehicle from sensors of the vehicle or any other external devices. Further, the apparatus 200 may transmit data or control signals to a control system of the vehicle. Additionally, the apparatus 200 may transmit additional data to any external devices of the vehicle, such as a remote server. Even though not explicitly illustrated in FIG. 3, the apparatus 300 may comprise user input devices such as one or more of a keyboard, a mouse, and a touchscreen. The apparatus 200 may further comprise means for communicating data to an occupant (e.g. a driver or passenger) of the vehicle, such as a display.

The memory 208 may be a non-transitory computer-readable storage medium. The memory 208 may be one or more of a buffer, a flash memory, a hard drive, a removable media, a volatile memory, a non-volatile memory, a random access memory (RAM), or another suitable device. In a typical arrangement, the memory 208 may include a non-volatile memory for long term data storage and a volatile memory that functions as system memory for the apparatus 200. The memory 208 may exchange data with the circuitry 202 over the data bus. Accompanying control lines and an address bus between the memory 208 and the circuitry 202 also may be present.

Functions and operations of the apparatus 200 may be implemented in the form of executable logic routines (e.g., lines of code, software programs, computer program products, etc.) that are stored on a non-transitory computer readable recording medium (e.g., the memory 208) of the apparatus 200 and are executed by the circuitry 202 (e.g. using the processor 204). Put differently, when it is stated that the circuitry 202 is configured to execute a specific function, the processor 204 of the circuitry 202 may be configured execute program code portions stored on the memory 208, wherein the stored program code portions correspond to the specific function. Furthermore, the functions and operations of the circuitry 202 may be a stand-alone software application or form a part of a software application that carries out additional tasks related to the circuitry 202. The described functions and operations may be considered a method that the corresponding device is configured to carry out, such as the method 100 discussed above in connection with FIG. 1. Also, while the described functions and operations may be implemented in software, such functionality may as well be carried out via dedicated hardware or firmware, or some combination of one or more of hardware, firmware, and software. In the following, the function and operations of the apparatus 200 is described.

The control circuitry 202 is configured to obtain a plurality of scenario parameters defining the environment of the vehicle, wherein each scenario parameter corresponds to a respective ODD condition. This may be performed e.g. by execution of the obtaining function 210.

The control circuitry 202 is further configured to, in response to the plurality of scenario parameters fulfilling the plurality of ODD conditions, allow the ADS to be activated or to remain active. This may be performed e.g. by execution of the allowing function 212.

The control circuitry 202 is further configured to, in response to one or more scenario parameter(s) not fulfilling one or more ODD condition(s), query a logic formula based on the obtained plurality of scenario parameters. This may be performed e.g. by execution of the querying function 214. As described above, the logic formula comprises a conjunction of a set of hard constraints and a set of soft constraints for a plurality of component capabilities of the ADS, such that if at least one soft constraint is satisfied without violating any hard constraints of the set of hard constraints, the ADS fulfils the plurality of predefined safety requirements. Each hard constraint of the set of hard constraints defines one or more of: dependencies between one or more component capabilities of the plurality of component capabilities of the ADS and one or more scenario parameters of the plurality of scenario parameters, dependencies between one or more component capabilities of the plurality of component capabilities of the ADS and one or more other component capabilities of the plurality of component capabilities of the ADS; or dependencies between one or more component capabilities of the plurality of component capabilities of the ADS and one or more variable state parameters of the ADS. Further, each soft constraint of the set of soft constraints defines a limit of one or more variable state parameters of the ADS.

The control circuitry 202 is further configured to determine, based on the logic formula and the obtained plurality of scenario parameters, a set of values of the one or more variable state parameters which satisfies at least one soft constraint of the set of soft constraints without violating any hard constraint of the set of hard constraints. This may be performed e.g. by execution of the determining function 216.

The control circuitry 202 is further configured to allow the ADS to be activated in a degraded mode or to switch to a degraded mode by limiting one or more variable state parameters of the ADS to conform to the determined set of values of the one or more variable state parameters. This may be performed e.g. by execution of the allowing function 212.

The control circuitry 202 may be further configured to store data indicative of one or more component capabilities that is affected by the one or more scenario parameters not fulfilling one or more corresponding ODD conditions. The stored data may then be transmitted to a remote server, e.g. by the transceiver 206. In response to the transmitted data, the control circuitry 202 may be further configured to receive a software update from the remote server.

The control circuitry 202 may be further configured to communicate the degraded mode to an occupant of the vehicle. This may e.g. be done by displaying information indicative of that the ADS operates in the degraded mode (or intends to operate in the degraded mode) on a display in the vehicle. The control circuitry 202 may be further configured to receive a take-over request from the occupant. In response to receiving the take-over request, the control circuitry 202 may be further configured to deactivate the ADS of the vehicle, e.g. by transmitting a deactivation signal to the control system of the vehicle or the ADS.

It should be noted that principles, features, aspects, and advantages of the method 100 as described above in connection with FIG. 1, are applicable also to the apparatus 200 described herein. For instance, the apparatus 200 may be configured to perform the additional steps of the method 100 as described above in connection with FIG. 1. The additional steps may be performed by the functions described herein, or by additional functions. In order to avoid undue repetition, reference is made to the above.

Figure 3:
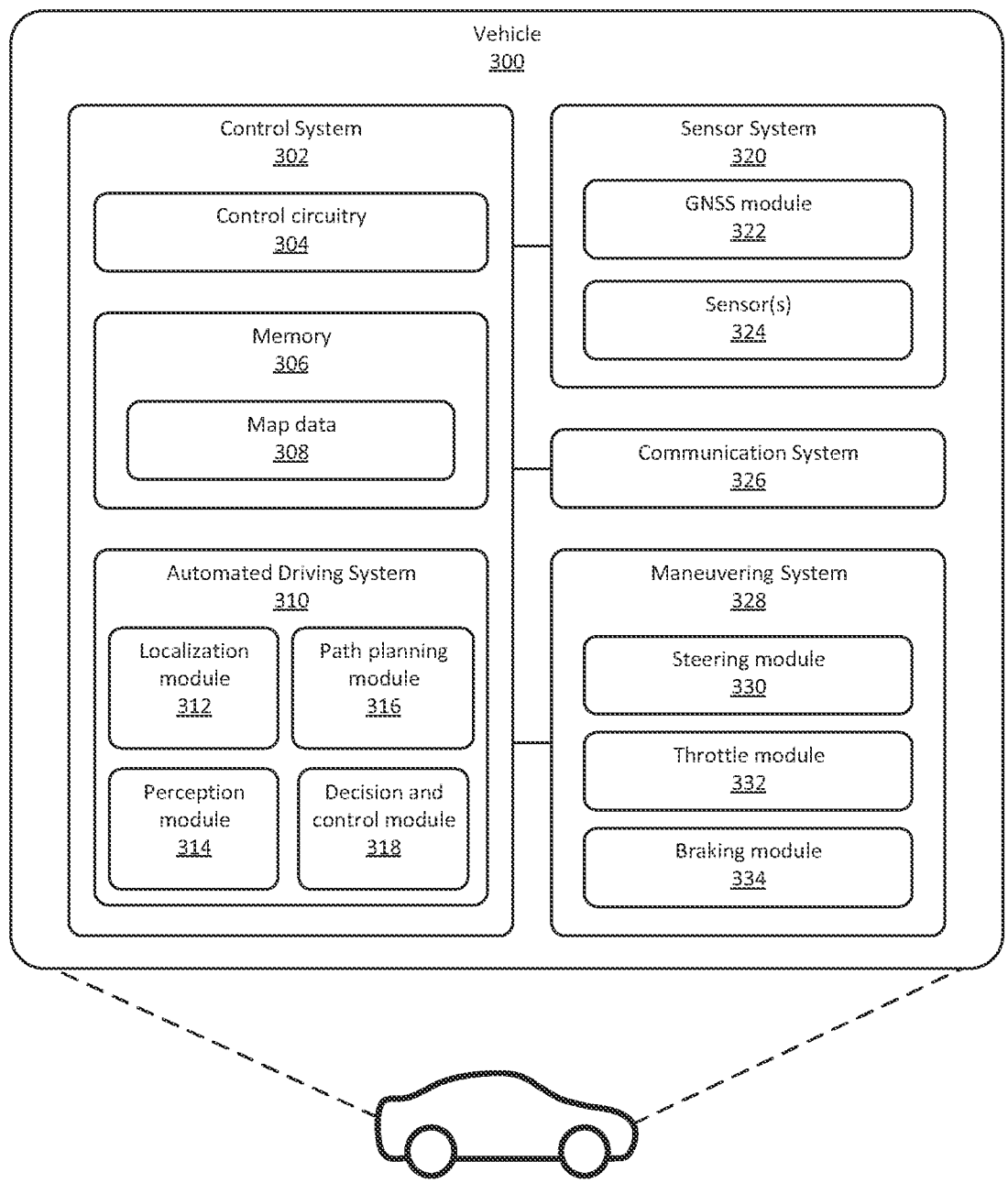
FIG. 3 schematically illustrates an ADS-equipped vehicle in accordance with some embodiments.

FIG. 3 is a schematic illustration of an example of a vehicle 300 equipped with an Automated Driving system (ADS) 310 in accordance with some embodiments. In other words, the vehicle may be an autonomous vehicle, e.g. in the sense that the vehicle may be a fully autonomous vehicle, a semi-autonomous (e.g. having an advanced driver-assisting function), or anything in between. As used herein, a "vehicle" is any form of motorized transport. For example, the vehicle 300 may be any road vehicle such as a car (as illustrated herein), a motorcycle, a (cargo) truck, a bus, a smart bicycle, etc.

As described above, an Operational Design Domain (ODD) is provided as part of the ADS. The ODD may be understood as a description of the operating domains in which the ADS is designed to function, including, but not limited to, geographic, roadway (e.g. type, surface, geometry, edges and markings), environmental parameters, connectivity, surrounding objects, and speed limitations. That is, an ADS feature may be associated with a specific environmental scenario and only configured to operate within an environment fulfilling a set of scenario parameters. Examples of scenarios are traffic jams, highway/expressway cruising, etc. The ODD may further define an allowable exposure to driving scenarios and their dynamics (e.g. traffic lights, intersections, jaywalkers, snow, ice, cut-ins, large animals, etc.). The scenario parameters may for example be obtained from sensor data from one or more vehicle-mounted sensors or communication data obtained from a remote server, or another vehicle via a Vehicle-to-Vehicle (V2V) communication protocol. The scenario parameters may for example be type of road, weather data, speed limitations, traffic density, number of available lanes, presence of roadwork, and so forth. Further examples of scenario parameters are given above in connection with FIG. 1.

As will become apparent from below, the vehicle 300 comprises an apparatus 200, as described above in connection FIG. 2, for managing an expansion of the ODD.

The vehicle 300 comprises a number of elements which can be commonly found in autonomous vehicles. It will be understood that the vehicle 300 can have any combination of the various elements shown in FIG. 3. Moreover, the vehicle 300 may comprise further elements than those shown in FIG. 3. While the various elements are herein shown as located inside the vehicle 300, one or more of the elements can be located externally to the vehicle 300. For example, the map data may be stored in a remote server and accessed by the various components of the vehicle 300 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 300 of FIG. 3 should be seen merely as an illustrative example, as the elements of the vehicle 300 can be realized in several different ways.

The vehicle 300 comprises a control system 302. The control system 302 is configured to carry out overall control of functions and operations of the vehicle 300. The wording "control system" should herein be seen as encompassing both centralized control systems (e.g. comprising one dedicated device/unit/element) and decentralized control systems (e.g. distributed over several devices/elements/units of the vehicle). The control system 302 comprises control circuitry 304 and a memory 306. The control circuitry 302 may physically comprise one single circuitry device. Alternatively, the control circuitry 302 may be distributed over several circuitry devices. As an example, the control system 302 may share its control circuitry 304 with other parts of the vehicle. The control circuitry 302 may comprise one or more processors, such as a central processing unit (CPU), microcontroller, or microprocessor. The one or more processors may be configured to execute program code stored in the memory 306, in order to carry out functions and operations of the vehicle 300. The processor(s) may be or include any number of hardware components for conducting data or signal processing or for executing computer code stored in the memory 306. The memory 306 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 306 may include database components, object code components, script components, or any other type of information structure for supporting the various activities of the present description.

The apparatus 200 as described above in connection with FIG. 2 may share its control circuitry 202 with the control circuitry 304 of the vehicle 300. Thus, the apparatus 200 may be implemented as part of the control system 302 of the vehicle 300. Alternatively, the apparatus 200 may be implemented as part of any other system or module of the vehicle 300 such as the ADS 510 as further described below. Alternatively, the apparatus 200 may be implemented as a separate module of the vehicle 300. Thus, the vehicle 300 is enabled for operating under an extended ODD as explained above in connection with FIGS. 1 and 2.

In the illustrated example, the memory 306 further stores map data 308. The map data 308 may for instance be used by the ADS 310 of the vehicle 300 in order to perform autonomous functions of the vehicle 300. The map data 308 may comprise high-definition (HD) map data. It is contemplated that the memory 306, even though illustrated as a separate element from the ADS 310, may be provided as an integral element of the ADS 310. In other words, according to some embodiments, any distributed or local memory device may be utilized in the realization of the present inventive concept. Similarly, the control circuitry 304 may be distributed e.g. such that one or more processors of the control circuitry 304 is provided as integral elements of the ADS 310 or any other system of the vehicle 300. In other words, according to some embodiments, any distributed or local control circuitry device may be utilized in the realization of the present inventive concept.

The ADS 310 is configured to carry out the functions and operations of the autonomous functions of the vehicle 300. The ADS 310 may comprise a number of modules, where each module is tasked with different functions or features of the ADS 310. ADS features (may also be referred to as ADS functions) is a level 3 feature or higher according to SAE J3016 levels of driving automation for on-road vehicles. The ADS feature may for example be a traffic jam pilot, a highway pilot, or any other SAE J3016 level 3+ ADS feature, as well as lower level features, such as a lane-change assist feature, a lane keeping assist feature (e.g. using map data), or an adaptive cruise control feature. Some examples of modules of the ADS 310 is further described below.

The vehicle 300 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 300. The sensor system 320 may further comprise one or more sensors 324. The sensor(s) 324 may be any type of on-board sensors, such as cameras, LIDARs, RADARs, ultrasonic sensors, gyroscopes, accelerometers, odometers, etc. It should be appreciated that the sensor system 320 may also provide the possibility to acquire sensory data directly or via dedicated sensor control circuitry in the vehicle 300. In particular, the sensor system 320 may be configured to acquire one or more scenario parameters defining the environment of the vehicle.

The vehicle 300 further comprises a communication system 326. The communication system 326 is configured to communicate with external units, such as other vehicles (i.e. via vehicle-to-vehicle (V2V) communication protocols), remote servers (e.g. cloud servers), databases, or other external devices, i.e. vehicle-to-infrastructure (V2I) or vehicle-to-everything (V2X) communication protocols. The communication system 326 may communicate using one or more communication technologies. The communication system 326 may comprise one or more antennas (not shown). Cellular communication technologies may be used for long range communication such as to remote servers or cloud computing systems. In addition, if the cellular communication technology used has low latency, it may also be used for V2V, V2I, or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 500 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g. remote operator or control center) and/or to receive input from a remote location by means of the one or more antennas. Moreover, the communication system 326 may be further configured to allow the various elements of the vehicle 300 to communicate with each other. As an example, the communication system 326 may provide a local network setup, such as CAN bus, I2C, Ethernet, optical fibers, and so on. Local communication within the vehicle 300 may also be of a wireless type with protocols such as WiFi, LoRa, Zigbee, Bluetooth, or similar mid/short range technologies.

In particular, the communication system 326 may be configured to obtain one or more scenario parameters defining the environment of the vehicle from external units, such as other vehicles or a remote server. The communication system 326 may be further configured to transmit data indicative of one or more component capabilities that is affected by the one or more scenario parameters not fulfilling one or more corresponding conditions of the plurality of conditions of the ODD to a remote server. In response, the communication system 326 may be configured to receive a software update.

The vehicle 300 further comprises a maneuvering system 328. The maneuvering system 328 is configured to control the maneuvering of the vehicle 300. The maneuvering system 328 comprises a steering module 330 configured to control the heading of the vehicle 300. The maneuvering system 328 further comprises a throttle module 332 configured to control actuation of the throttle of the vehicle 300. The maneuvering system 328 further comprises a braking module 334 configured to control actuation of the brakes of the vehicle 300. The various modules of the maneuvering system 328 may also receive manual input from a driver of the vehicle 300 (i.e. from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 300, for example via a decision and control module 318.

The ADS 310 may comprise a localization module 312 or localization block/system. The localization module 312 is configured to determine and/or monitor a geographical position and heading of the vehicle 300, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy. Geographical position of the ego-vehicle is in the present context to be construed as a map position (may also be referred to as in-map position) of the ego-vehicle. In other words, a geographical position or map position can be understood as a set (two or more) of coordinates in a global coordinate system.

The ADS 310 may further comprise a perception module 314 or perception block/system 314. The perception module 314 may refer to any commonly known module and/or functionality, e.g. comprised in one or more electronic control modules and/or nodes of the vehicle 300, adapted and/or configured to interpret sensory data—relevant for driving of the vehicle 300—to identify e.g. obstacles, vehicle lanes, relevant signage, appropriate navigation paths, persons etc. The perception module 314 may thus be adapted to rely on and obtain inputs from multiple data sources, such as automotive imaging, image processing, computer vision, and/or in-car networking, etc., in combination with sensory data e.g. from the sensor system 320.

The localization module 512 and/or the perception module 514 may be communicatively connected to the sensor system 520 in order to receive sensory data from the sensor system 520. The localization module 512 and/or the perception module 514 may further transmit control instructions to the sensor system 520.

The ADS may further comprise a path planning module 316. The path planning module 316 is configured to determine a planned path of the vehicle 300 based on a perception and location of the vehicle as determined by the perception module 314 and the localization module 312 respectively. A planned path determined by the path planning module 316 may be sent to the maneuvering system 328 for execution.

The ADS may further comprise a decision and control module 318. The decision and control module 318 is configured to perform the control and make decisions of the ADS 310. For example, the decision and control module 318 may decide on whether the planned path determined by the path planning module 316 should be executed or not.

It should be understood that parts of the described technology may be implemented either in the vehicle 300, in a system located external the vehicle 300, or in a combination of internal and external the vehicle 300; for instance in a server in communication with the vehicle, a so-called cloud solution. For instance, scenario parameters may be determined by the sensor system 320 of the vehicle 300 and sent to an external system that in turn performs the remaining steps of the method 100. The different features and steps of the embodiments may be combined in other combinations than those described.

In the following, an illustrative example will be presented for improved understanding of the presently disclosed technology. The following example should not in any way be seen as limiting of the scope of the present inventive concept.

Assume that a vehicle has two sensors, Sensor1 and Sensor2 and a brake system, BrakeSystem. Sensor1 and Sensor2 has a respective detection range denoted by Sensor1Range and Sensor2Range. The detection ranges herein depends on an amount of rain. In particular, Sensor1 has a maximum detection range of 8 units. In rain above a rate of 1 unit, Sensor1 has a detection rate of 4 units, and in rain above a rate of 2 units, Sensor1 does not work at all. These component capabilities of Sensor1 can be formulized as ($\rightarrow$ denoting implication):

$$\text{Sensor1} \rightarrow \text{Sensor1}Req1 \vee \text{Sensor1}Req2 \vee \text{Sensor1}Req3 \quad (1)$$

$$\text{Sensor1}Req1 \rightarrow \text{Sensor1Range} \leq 8 \wedge \text{rain} \leq 1 \quad (2)$$

$$\text{Sensor1}Req2 \rightarrow \text{Sensor1Range} \leq 4 \wedge \text{rain} \leq 2 \quad (3)$$

$$\text{Sensor1}Req3 \rightarrow \text{Sensor1Range} = 0 \wedge \text{rain} > 2 \quad (4)$$

Sensor2 has a detection range of 4 units, and does not work at all in rain above a rate of 2 units. These component capabilities of Sensor1 can be formulized as:

$$\text{Sensor2} \rightarrow \text{Sensor2}Req1 \vee \text{Sensor2}Req2 \quad (5)$$

$$\text{Sensor2}Req1 \rightarrow \text{Sensor2Range} \leq 4 \wedge \text{rain} \leq 2 \quad (6)$$

$$\text{Sensor2}Req2 \rightarrow \text{Sensor2Range} = 0 \wedge \text{rain} > 2 \quad (7)$$

If both Sensor1 and Sensor2 works at full capacity, they have a combined detection range of 12.

For the sake of the present example, it is assumed that the detection ranges only depend on an amount of rain. It should however be noted that in a real life scenario, the detection ranges may depend on additional parameters.

It is further assumed that the vehicle cannot drive faster than that it can stop at a position that is within the combined detection range of Sensor1 and Sensor2. The braking system can handle maximum speeds of 2, 4, 6 and 8 units for detection ranges of 2, 4, 8 and 16 units respectively. These component capabilities of the brake system can be formulized as:

$$BrakeSystem \rightarrow \quad (8)$$
$$BrakeReq1 \vee BrakeReq2 \vee BrakeReq3 \vee BrakeReq4 \vee BrakeReq5$$

$$BrakeReq1 \rightarrow \text{speed} \leq 8 \wedge \text{Sensor1Range} + \text{Sensor2Range} \geq 16 \quad (9)$$

$$BrakeReq2 \rightarrow \text{speed} \leq 6 \wedge \text{Sensor1Range} + \text{Sensor2Range} \geq 8 \quad (10)$$

$$BrakeReq3 \rightarrow \text{speed} \leq 4 \wedge \text{Sensor1Range} + \text{Sensor2Range} \geq 4 \quad (11)$$

$$BrakeReq4 \rightarrow \text{speed} \leq 2 \wedge \text{Sensor1Range} + \text{Sensor2Range} \geq 2 \quad (12)$$

$$BrakeReq5 \rightarrow \text{speed} \leq 0 \wedge \text{Sensor1Range} + \text{Sensor2Range} \geq 0 \quad (13)$$

A general logic formula comprising a conjunction of hard constraints, HC_1 to HC_N, and soft constraints, SC_1 to SC_M, can be formulated as, $$(HC\_1) \wedge (HC\_2) \wedge \ldots \wedge (HC\_N) \wedge (SC\_1) \wedge (SC\_2) \wedge \ldots \wedge (SC\_M).$$

In the present example, the hard constraints can be formed by a constraint on each component which must be satisfied, i.e., $$(\text{Sensor1}) \wedge (\text{Sensor2}) \wedge (BrakeSystem) \wedge$$
$$(1) \wedge (2) \wedge (3) \wedge (4) \wedge (5) \wedge (6) \wedge (7) \wedge (8) \wedge (9) \wedge (10) \wedge (11) \wedge (12) \wedge (13),$$

where the numbers in parenthesis refer to the equations above.

In other words, each component (i.e. equations (1), (5) and (8) for Sensor1, Sensor2 and BrakeSystem) may form a respective hard constraint. The soft constraints in this example is formed by different limits of a speed v of the vehicle, e.g. v=0, v>0, v>2, v>4, v>6, and v>8. Each hard constraint may in turn comprise plurality of different requirements defining different series of logical expressions as seen in the equations (1)-(13) above.

The logical formula can then be solved to find a set of values of one or more variable state parameters that satisfies the most soft constraints without violating any hard constraints. Put differently, the logical formula is solved to find the least restraining values of the variable state parameters that fulfils at least one requirement of each module. Thus, the aim is to limit the performance of the ADS as little as possible while still satisfying the hard constraints.

As an example, assume a rate of rain of 2 units. Looking at equations (2)-(4) it can be concluded that Sensor1 at best has a detection range of 4 units. Looking at equations (6) and (7) it can be concluded that Sensor2 at best has a detection range of 4 units. A combined detection rate of Sensor1 and Sensor2 is thus 8. Looking at equations (9)-(13) it can be concluded that all but equation (9) can be fulfilled while also fulfilling the conditions of Sensor1 and Sensor2. Thus, the least restraining set of the variable state parameters (i.e. the highest possible speed in this case) is a speed of 6 units. In other words, all soft constraints but v>8 is fulfilled.

It should be noted that the reverse lookup may be performed as well, in order to determine e.g. a threshold of a rate of rain for a number of different speeds. For example, the speed can be set to a fixed value and different values of rain rate can be set as soft constraints. In such embodiments, the soft constraint may accordingly define a limit of one or more scenario parameters. Further, querying the logic formula may be based on the speed as a scenario parameter. Performing a reverse lookup in this way may allow for generation of a lookup table of values which can be used to determine safe subsets outside the ODD.

The above is a simple example for illustrating the concept of the presently disclosed technology. However, the complexity of this combinatorial problem increases rapidly as the number of components and requirements increases. By the proposed technology of utilizing automatic and dynamical reasoning the problem can be solved in an efficient way.

In the above example, the hard constraints are formulated on a component level. It should however be noted that the hard constraints may be formulated on a higher level. For example, a hard constraint for a path planner, herein denoted planner, may be formulated at a safety requirement level (herein the so called ASIL-D requirement), such as:

Planner → $ASILb1 \lor ASILb2 \lor$ $ASILb3 \lor ASILb4 \lor ASILb5 \lor ASILb6 \lor ASILb7 \lor ASILb8$, where the different sub-requirements can be formulated as:

$$ASILb1 \to v < 100 \land brake1 \land brake2 \land camera \land radar$$

$$ASILb2 \to v < 80 \land brake1 \land brake2 \land (camera \lor radar)$$

$$ASILb3 \to v \le 0 \land brake1 \land brake2$$

$$ASILb4 \to v < 50 \land (brake1 \lor brake2) \land camera \land radar$$

$$ASILb5 \to v < 4 \land (brake1 \lor brake2) \land camera$$

$$ASILb6 \to v < 40 \land (brake1 \lor brake2) \land radar$$

-continued $$ASILb7 \to v \le 0 \land radar \land camera$$

$$ASILb8 \to v \le 0.$$

The soft constraints may e.g. be formulated as v=0, v>0, v>4, v>40, v>50, v>54, v>64, v>80, v>100, brake1, brake2, camera and radar herein refers to different constraints on different components, which in turn may comprise different requirements, such as those described above in equations (1)-(13).

The present inventive concept has been presented above with reference to specific embodiments. However, other embodiments than the above described are possible and within the scope of the inventive concept. Different method steps than those described above, performing the method by hardware or software, may be provided within the scope of the inventive concept. Thus, according to some embodiments, there is provided a non-transitory computer-readable storage medium storing one or more programs configured to be executed by one or more processors of a vehicle control system, the one or more programs comprising instructions for performing the method according to any one of the above-discussed embodiments. Alternatively, according to some other embodiments a cloud computing system can be configured to perform any of the methods presented herein. The cloud computing system may comprise distributed cloud computing resources that jointly perform the methods presented herein under control of one or more computer program products.

It is to be noted that a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

It should be noted that any reference signs do not limit the scope of the claims, that the inventive concept may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the inventive concept. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present inventive concept.

Other solutions, uses, objectives, and functions within the scope of the inventive concept as claimed in the below described patent claims should be apparent for the person skilled in the art.

As used herein, the term "if" may be construed to mean "when or "upon" or "in response to determining or "in response to detecting" depending on the context. Similarly, the phrase" if it is determined' or "when it is determined" or "in an instance of" may be construed to mean "upon determining or "in response to determining" or "upon detecting and identifying occurrence of an event" or "in response to detecting occurrence of an event" depending on the context.

As used herein, the wording "one or more of a set of elements" (as in "one or more of A, B and C" or "at least one of A, B and C") is to be interpreted as either a conjunctive or disjunctive logic. Put differently, it may refer either to all elements, one element or combination of two or more elements of a set of elements. For example, the wording "one or more of A, B and C" may be interpreted as A or B or C, A and B and C, A and B, B and C, or A and C.

The invention claimed is:

1. A computer-implemented method for managing an Operational Design Domain (ODD) expansion for an Automated Driving System (ADS) of a vehicle, wherein the ODD comprises a plurality of ODD conditions that are to be fulfilled by an environment of the vehicle in order to ensure a fulfilment of a plurality of predefined safety requirements, the method comprising:
   obtaining a plurality of scenario parameters defining the environment of the vehicle, wherein each scenario parameter corresponds to a respective ODD condition;
   in response to the plurality of scenario parameters fulfilling the plurality of ODD conditions:
      allowing the ADS to be activated or to remain active;
   in response to one or more scenario parameter(s) not fulfilling one or more ODD condition(s):
      querying a logic formula based on the obtained plurality of scenario parameters, wherein the logic formula comprises a conjunction of a set of hard constraints and a set of soft constraints for a plurality of component capabilities of the ADS, such that if at least one soft constraint is satisfied without violating any hard constraints of the set of hard constraints, the ADS fulfils the plurality of predefined safety requirements;
      wherein each hard constraint of the set of hard constraints defines one or more of:
         dependencies between one or more component capabilities of the plurality of component capabilities of the ADS and one or more scenario parameters of the plurality of scenario parameters,
         dependencies between one or more component capabilities of the plurality of component capabilities of the ADS and one or more other component capabilities of the plurality of component capabilities of the ADS; or
         dependencies between one or more component capabilities of the plurality of component capabilities of the ADS and one or more variable state parameters of the ADS,
      wherein each soft constraint of the set of soft constraints defines a limit of one or more variable state parameters of the ADS;
      determining, based on the logic formula and the obtained plurality of scenario parameters, a set of values of the one or more variable state parameters which satisfies at least one soft constraint of the set of soft constraints without violating any hard constraint of the set of hard constraints; and
      allowing the ADS to be activated in a degraded mode or to switch to a degraded mode by limiting one or more variable state parameters of the ADS to conform to the determined set of values of the one or more variable state parameters.

2. The method according to claim 1, wherein determining the set of values of the one or more variable state parameters comprises:
   solving a function based on the logic formula using the obtained plurality of scenario parameters as input and varying the one or more variable state parameters of the ADS in order to obtain an output indicative of the set of values of the one or more variable state parameters which satisfies at least one soft constraint of the set of soft constraints without violating any hard constraint of the set of hard constraints.

3. The method according to claim 1, further comprising storing data indicative of one or more component capabilities that is affected by the one or more scenario parameters not fulfilling one or more corresponding ODD conditions.

4. The method according to claim 3, further comprising transmitting the stored data to a remote server.

5. The method according to claim 4, further comprising receiving, from the remote server, a software update, in response to the transmitted stored data.

6. The method according to claim 1, wherein the ODD conditions and/or scenario parameters defining the environment of the vehicle comprises at least one of weather conditions, visibility in the surrounding environment, road condition parameters, driving scenario parameters, geographic data parameters, map data parameters, presence of Vulnerable Road Users (VRUs), connectivity parameters, and surrounding object parameters.

7. The method according to claim 1, wherein the variable state parameters of the ADS comprise at least one of a vehicle speed, automated lane change allowableness, distance to lead vehicle, steering angle, steering angle rate, brake level, acceleration level, acceleration and brake rate, lane choice, allowability of certain turns, overtakes, lateral distance to objects, closeness to lane markers or road edge.

8. The method according to claim 1, wherein the degraded mode is any one of limiting a speed of the vehicle, requiring driver-supervision and/or requesting hands-on-wheel.

9. The method according to claim 1, wherein the method further comprises:
   communicating the degraded mode to an occupant of the vehicle, and
   in response to receiving a take-over request from the occupant, deactivating the ADS of the vehicle.

10. The method according to claim 1, wherein the one or more scenario parameters not fulfilling the one or more corresponding conditions of the ODD are temporary changes or relatively static changes of the environment.

11. The method according to claim 1, wherein the degraded mode is a non-restrictive mode allowing the vehicle to continue to drive as before under a condition, or a restrictive mode allowing the vehicle to continue to drive with reduced performance.

12. The method according to claim 1, wherein the ADS is in the degraded mode as long as the plurality of scenario parameters remains the same.

13. A non-transitory computer readable storage medium comprising instructions which, when the program is executed by a computing device, causes the computer to carry out the method according to claim 1.

14. An apparatus for managing an Operational Design Domain (ODD) expansion for an Automated Driving System (ADS) of a vehicle, wherein the ODD comprises a plurality of ODD conditions that are to be fulfilled by an environment of the vehicle in order to ensure a fulfilment of a plurality of predefined safety requirements, the apparatus comprising control circuitry configured to:
  obtain a plurality of scenario parameters defining the environment of the vehicle, wherein each scenario parameter corresponds to a respective ODD condition;
  in response to the plurality of scenario parameters fulfilling the plurality of ODD conditions:
    allow the ADS to be activated or to remain active;
  in response to one or more scenario parameter(s) not fulfilling one or more ODD condition(s):
    query a logic formula based on the obtained plurality of scenario parameters, wherein the logic formula comprises a conjunction of a set of hard constraints and a set of soft constraints for a plurality of component capabilities of the ADS, such that if at least one soft constraint is satisfied without violating any hard constraints of the set of hard constraints, the ADS fulfils the plurality of predefined safety requirements;
    wherein each hard constraint of the set of hard constraints defines one or more of:
      dependencies between one or more component capabilities of the plurality of component capabilities of the ADS and one or more scenario parameters of the plurality of scenario parameters,
      dependencies between one or more component capabilities of the plurality of component capabilities of the ADS and one or more other component capabilities of the plurality of component capabilities of the ADS; or
      dependencies between one or more component capabilities of the plurality of component capabilities of the ADS and one or more variable state parameters of the ADS,
    wherein each soft constraint of the set of soft constraints defines a limit of one or more variable state parameters of the ADS;
    determine, based on the logic formula and the obtained plurality of scenario parameters, a set of values of the one or more variable state parameters which satisfies at least one soft constraint of the set of soft constraints without violating any hard constraint of the set of hard constraints; and
    allow the ADS to be activated in a degraded mode or to switch to a degraded mode by limiting one or more variable state parameters of the ADS to conform to the determined set of values of the one or more variable state parameters.

15. A vehicle comprising:
an automated driving system, ADS, and
an apparatus for managing an Operational Design Domain (ODD) expansion for the ADS of the vehicle, wherein the ODD comprises a plurality of ODD conditions that are to be fulfilled by an environment of the vehicle in order to ensure a fulfilment of a plurality of predefined safety requirements, the apparatus comprising control circuitry configured to:
  obtain a plurality of scenario parameters defining the environment of the vehicle, wherein each scenario parameter corresponds to a respective ODD condition;
  in response to the plurality of scenario parameters fulfilling the plurality of ODD conditions:
    allow the ADS to be activated or to remain active;
  in response to one or more scenario parameter(s) not fulfilling one or more ODD condition(s):
    query a logic formula based on the obtained plurality of scenario parameters, wherein the logic formula comprises a conjunction of a set of hard constraints and a set of soft constraints for a plurality of component capabilities of the ADS, such that if at least one soft constraint is satisfied without violating any hard constraints of the set of hard constraints, the ADS fulfils the plurality of predefined safety requirements;
    wherein each hard constraint of the set of hard constraints defines one or more of:
      dependencies between one or more component capabilities of the plurality of component capabilities of the ADS and one or more scenario parameters of the plurality of scenario parameters,
      dependencies between one or more component capabilities of the plurality of component capabilities of the ADS and one or more other component capabilities of the plurality of component capabilities of the ADS; or
      dependencies between one or more component capabilities of the plurality of component capabilities of the ADS and one or more variable state parameters of the ADS,
    wherein each soft constraint of the set of soft constraints defines a limit of one or more variable state parameters of the ADS;
    determine, based on the logic formula and the obtained plurality of scenario parameters, a set of values of the one or more variable state parameters which satisfies at least one soft constraint of the set of soft constraints without violating any hard constraint of the set of hard constraints; and
    allow the ADS to be activated in a degraded mode or to switch to a degraded mode by limiting one or more variable state parameters of the ADS to conform to the determined set of values of the one or more variable state parameters.

* * * * *